United States Patent
Chiu et al.

(10) Patent No.: US 10,812,566 B2
(45) Date of Patent: *Oct. 20, 2020

(54) DISTRIBUTED STEAM PROCESSING

(71) Applicant: PayPal, Inc., San Jose, CA (US)

(72) Inventors: Chi-Hsien Chiu, Milpitas, CA (US); Patrick Crane, East Greenwich, RI (US); Alyssa Neckorcuk, Dedham, MA (US); Gyanit Singh, San Jose, CA (US); Neelakantan Sundaresan, Mountain View, CA (US)

(73) Assignee: PayPal, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/672,277

(22) Filed: Aug. 8, 2017

(65) Prior Publication Data

US 2018/0063226 A1 Mar. 1, 2018

Related U.S. Application Data

(63) Continuation of application No. 14/929,929, filed on Nov. 2, 2015, now Pat. No. 9,729,612, which is a continuation of application No. 12/718,934, filed on Mar. 5, 2010, now Pat. No. 9,178,935.

(60) Provisional application No. 61/157,865, filed on Mar. 5, 2009.

(51) Int. Cl.
*H04L 29/08* (2006.01)

(52) U.S. Cl.
CPC .............. *H04L 67/06* (2013.01); *H04L 67/10* (2013.01); *H04L 67/1097* (2013.01)

(58) Field of Classification Search
CPC ...... H04L 67/06; H04L 67/10; H04L 67/1097

USPC ......................................................... 709/208
See application file for complete search history.

(56) References Cited

U.S. PATENT DOCUMENTS

| | | | |
|---|---|---|---|
| 6,338,149 B1 | 1/2002 | Ciccone et al. | |
| 7,353,240 B1* | 4/2008 | Takamoto | G06F 17/30076 |
| 7,891,004 B1* | 2/2011 | Gelvin | H04L 67/12 |
| | | | 726/26 |
| 7,966,599 B1* | 6/2011 | Malasky | G06F 9/455 |
| | | | 717/100 |
| 8,225,002 B2 | 7/2012 | Gertner | |
| 8,751,597 B1* | 6/2014 | Hickman | H04L 67/08 |
| | | | 709/208 |
| 9,178,935 B2 | 11/2015 | Chiu et al. | |
| 9,729,612 B2 | 8/2017 | Chiu et al. | |
| 2003/0115218 A1* | 6/2003 | Bobbitt | G06F 16/188 |
| 2004/0243673 A1 | 12/2004 | Goyal et al. | |
| 2006/0053216 A1* | 3/2006 | Deokar | G06F 21/6218 |
| | | | 709/223 |
| 2006/0206873 A1 | 9/2006 | Argade | |

(Continued)

OTHER PUBLICATIONS

Entire Prosecution History of U.S. Appl. No. 14/929,929, titled Distributed Stream Processing, filed Nov. 2, 2015.

(Continued)

*Primary Examiner* — Joseph L Greene

(57) ABSTRACT

A method and system for forming hybrid cluster to process log files are described. In example embodiments, a method configures a node to execute as a first slave node. The first slave node executes in a first operating environment. The method also adds the first slave node to a Hadoop cluster. The Hadoop cluster includes a second slave node that operates in a second and different operating environment.

20 Claims, 9 Drawing Sheets

(56) References Cited

U.S. PATENT DOCUMENTS

| | | |
|---|---|---|
| 2007/0006036 A1* | 1/2007 | Devas .................... G06F 11/36 |
| | | 714/38.14 |
| 2007/0192475 A1 | 8/2007 | Das et al. |
| 2007/0220509 A1 | 9/2007 | Shwartz et al. |
| 2008/0250267 A1 | 10/2008 | Brown et al. |
| 2009/0036111 A1* | 2/2009 | Danford ............. H04L 41/0893 |
| | | 455/419 |
| 2010/0042688 A1 | 2/2010 | Maghraby |
| 2010/0146331 A1 | 6/2010 | Reed et al. |
| 2010/0299326 A1* | 11/2010 | Germaise ......... G06F 17/30867 |
| | | 707/728 |
| 2010/0306286 A1 | 12/2010 | Chiu et al. |
| 2016/0057204 A1 | 2/2016 | Chiu et al. |

OTHER PUBLICATIONS

Entire Prosecution History of U.S. Appl. No. 12/718,934, titled Distributed Stream Processing, filed Mar. 5, 2010.

* cited by examiner ically, smaller chunks of data including key-value pairs are distributed among slave nodes such that those chunks of data with similar keys are grouped together. This allows for easy access to similar data based on the keys and parallel processing of the data.

DISTRIBUTED STEAM PROCESSING

RELATED APPLICATIONS

This application is a continuation of U.S. patent application Ser. No. 14/929,929, filed on Nov. 2, 2015, now U.S. Pat. No. 9,729,612, issued Aug. 8, 2017; which is a continuation of U.S. patent application Ser. No. 12/718,934, filed on Mar. 5, 2010, now U.S. Pat. No. 9,178,935, issued Nov. 3, 2015; which claims priority to and the benefit of U.S. Provisional Patent Application Ser. No. 61/157,865, filed on Mar. 5, 2009; all of which are incorporated herein in their entirety.

TECHNICAL FIELD

The subject matter disclosed herein generally relates to the field of Internet-based commerce. Specifically, the present disclosure addresses systems and methods of integrating Hadoop clusters operating within different operating environments to process a content provider's log files.

BACKGROUND

With the widespread acceptance of the Internet as a ubiquitous, interactive communication and interaction platform, the Internet has become a popular platform for storing information. For example, to better compete in an evolving online world, many content providers (e.g., online marketplaces) store and analyze log data. This data typically contains user actions and queries, and enables companies to better understand and serve the needs of their clients. However, content providers may store large log files on a daily basis resulting in the need for an effective means of analyzing that information.

BRIEF DESCRIPTION OF DRAWINGS

Embodiments of the present invention are illustrated by way of example and not limitation in the figures of the accompanying drawings, in which like reference numbers indicate similar elements.

DETAILED DESCRIPTION

Figure 1:
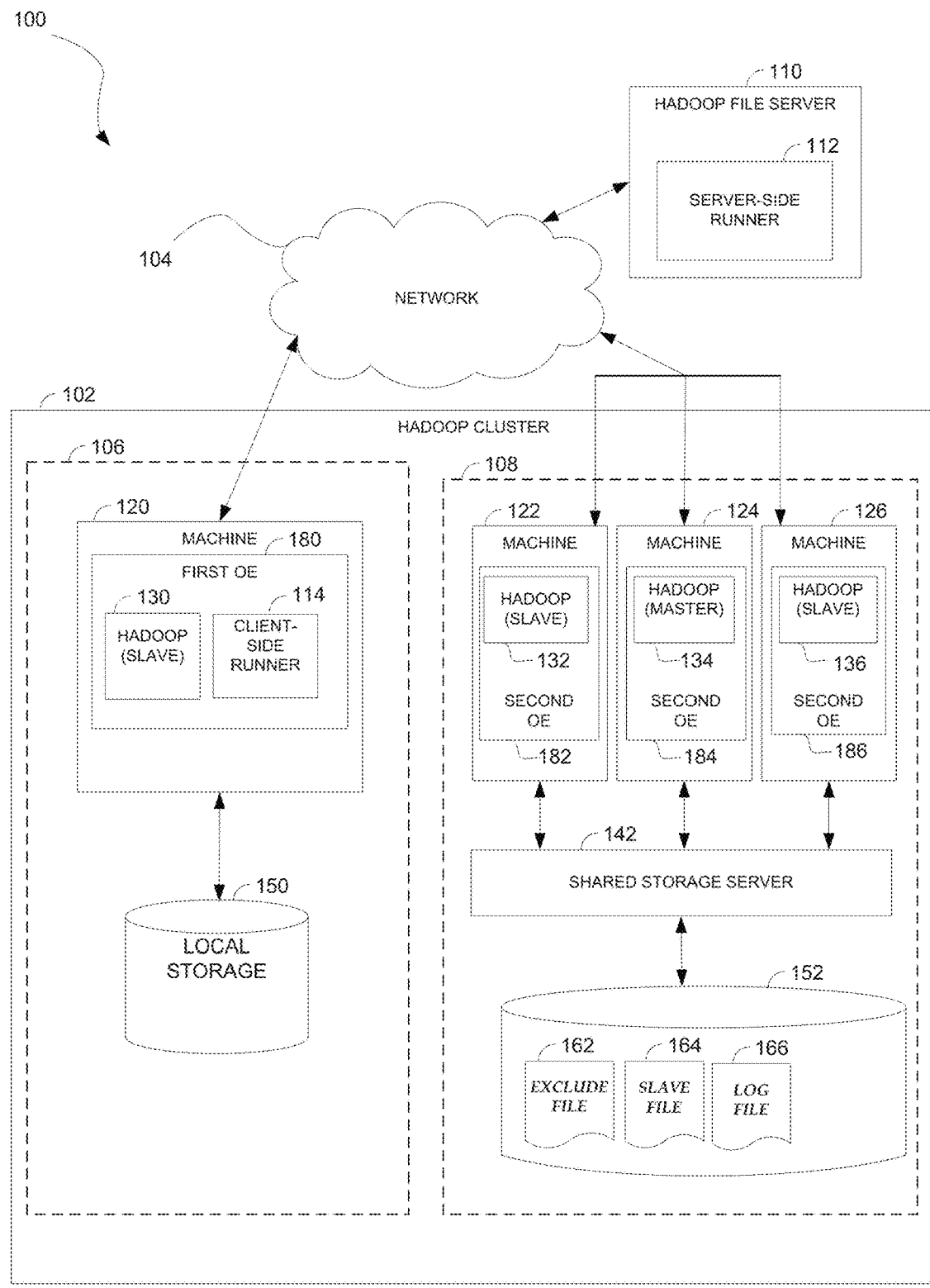
FIG. 1 is a network diagram depicting a system, within which one example embodiment of a hybrid Hadoop cluster may be deployed.

Example systems and methods are directed to integrating a first Hadoop cluster, operating within a first operating environment, with a second Hadoop cluster, operating within a second operating environment, to process log data in a content serving platform. In the following description, for purposes of explanation, numerous specific details are set forth in order to provide a thorough understanding of some example embodiments. It will be evident, however, to one skilled in the art that the present invention may be practiced without these specific details. Further, well-known instruction instances, protocols, structures, and techniques have not been shown in detail.

Hadoop is currently one of the most popular methods of distributing and processing data. Hadoop is an Apache open-source software project that implements Google's Map Reduce framework. Hadoop processes large quantities of data by distributing the data among slave nodes in a cluster, and utilizing a map-reduce algorithm to process that data. The first portion of the map-reduce algorithm is the map process, in which the data (in the form of key-value pairs) is split into manageable segments by a master node. Basically, smaller chunks of data including key-value pairs are distributed among slave nodes such that those chunks of data with similar keys are grouped together. This allows for easy access to similar data based on the keys and parallel processing of the data.

Hadoop may be used to process large log files containing web page information. In this situation, a system may execute the map phase to split the log data into smaller segments according to a common feature as determined by the key portion of the key-value pair. For example, Internet data may be grouped according to domain. Further, the system may execute the map phase to process the data by grouping it such that the key is the domain and the content is the value. This data may then be split among slave nodes in the cluster such that data with similar keys are grouped together.

The reduce portion of the Map/Reduce Operations first requires some of the data to be processed by a specific job that is run on the slave nodes. The Hadoop user is responsible for writing the job algorithm. Accordingly, the actual operations performed during process may vary based on the type of file, the company running the cluster, and their ultimate goals. Once the Map/Reduce Operations are complete, a resulting output is produced.

When the reduce function begins, the processed output is separated among the slave nodes in the computing cluster based on how the data was initially distributed (in our previous example, it was by a URL's domain). The purpose of the reduce operations is to take all of these individual answers and output a single final result. The reduce operation aggregates all of the individual answers and combines the results using a reduction algorithm. The reduction algorithm may be a process the Hadoop user writes. Accordingly, the actual operations of a reduction algorithm may vary. Responsive to a reduction algorithm completing the system may append the output to a file and sort the file.

Returning to the website URL example, suppose the original data consisted of logs that stored web addresses and content. The original map process may split the data based on website URL as described previously. Suppose we wanted to solve the problem of finding all web pages that contain information about Hadoop. Each slave node may search for Hadoop information in its data, and send back a list of applicable key/value pairs that matched our request. The reducer may combine the lists returned by all Hadoop slave nodes to give a final result containing a sorted list of all web pages containing information about Hadoop.

To process log data of a service provider, the log storage and processing system may utilize a Hadoop cluster. Further, processing the log files on developer machines may speed up log processing time. This may allow the jobs to complete faster and, as a result, they may free up the servers to perform more jobs in a single day, or more complex job task. However, despite its many benefits, Hadoop does not natively support running on Windows. Rather, Hadoop only currently supports UNIX- or Linux-based systems. Therefore, because a substantial number of workstations of an enterprise may operate on Windows, such workstations may not be used to process the log data.

A method and system, described according to an example embodiment, integrates a native Hadoop cluster (e.g., Hadoop running on UNIX-based systems) with an unsupported Hadoop cluster (e.g., Hadoop running on Windows-based systems) to form a hybrid Hadoop cluster.

Further details regarding the various example embodiments described above will now be discussed with reference to the figures accompanying the present specification.

FIG. 1 is a network diagram depicting a system 100, according to an example embodiment. The system 100 may, for example, include a content provider, within which one example embodiment of a hybrid Hadoop cluster may be deployed.

The system 100 is shown to include a hybrid Hadoop cluster 102 and a Hadoop File Server 110. The hybrid Hadoop cluster 102 may include a first Hadoop cluster 106 and a second Hadoop cluster 108. As shown, the second Hadoop cluster 108 includes machines 122, 124, and 126. In an example embodiment, machines 122, 124, and 126 each run a second operating environment (OE), 182, 184, and 186 respectively. The second OEs 182, 184, and 186 may provide a Linux environment. That is, the machines 122, 124, 126 run operating environments that are natively supported by Hadoop.

A Hadoop cluster may include one or more slave nodes and at least one master node. In a Hadoop environment, the slaves nodes may perform jobs or tasks of the map reduce algorithm and the master node may perform administrative functions of the map reduce algorithm (e.g., provide a point of interaction between an end-user and the cluster, manage job tasks, and regulate access to file system).

FIG. 1 illustrates that the machines 122 and 126 operate slave nodes 132 and 136. Further, machine 124 operates master node 134. Because the slave nodes 132 and 136 operate within the an operating environment supported by Hadoop, each slave node has direct access to a network file system 152 via a shared storage server 142.

The first Hadoop cluster 120 includes a machine 120 operating a Hadoop slave 130. Unlike the machines 122, 124, and 126, the machine 120 runs a first OE 180 that does not natively support Hadoop. In an example embodiment, a first OE 180 may represent the Windows platform that is operated by the machine 120. The machine 120 also accesses a local storage 150 rather than the network file system 152 via the shared storage server 142.

As shown, a network 104 (e.g., the Internet, Wide Area Network (WAN), etc.) may be utilized to connect a Hadoop fileserver 110 to the hybrid Hadoop cluster 102. As will be described below, the Hadoop file server 110 enables indirect file access from the first Hadoop cluster 106 to the network file system 152 via a connection between a client-side runner module 114 and a server-side runner module 112.

Figure 2:
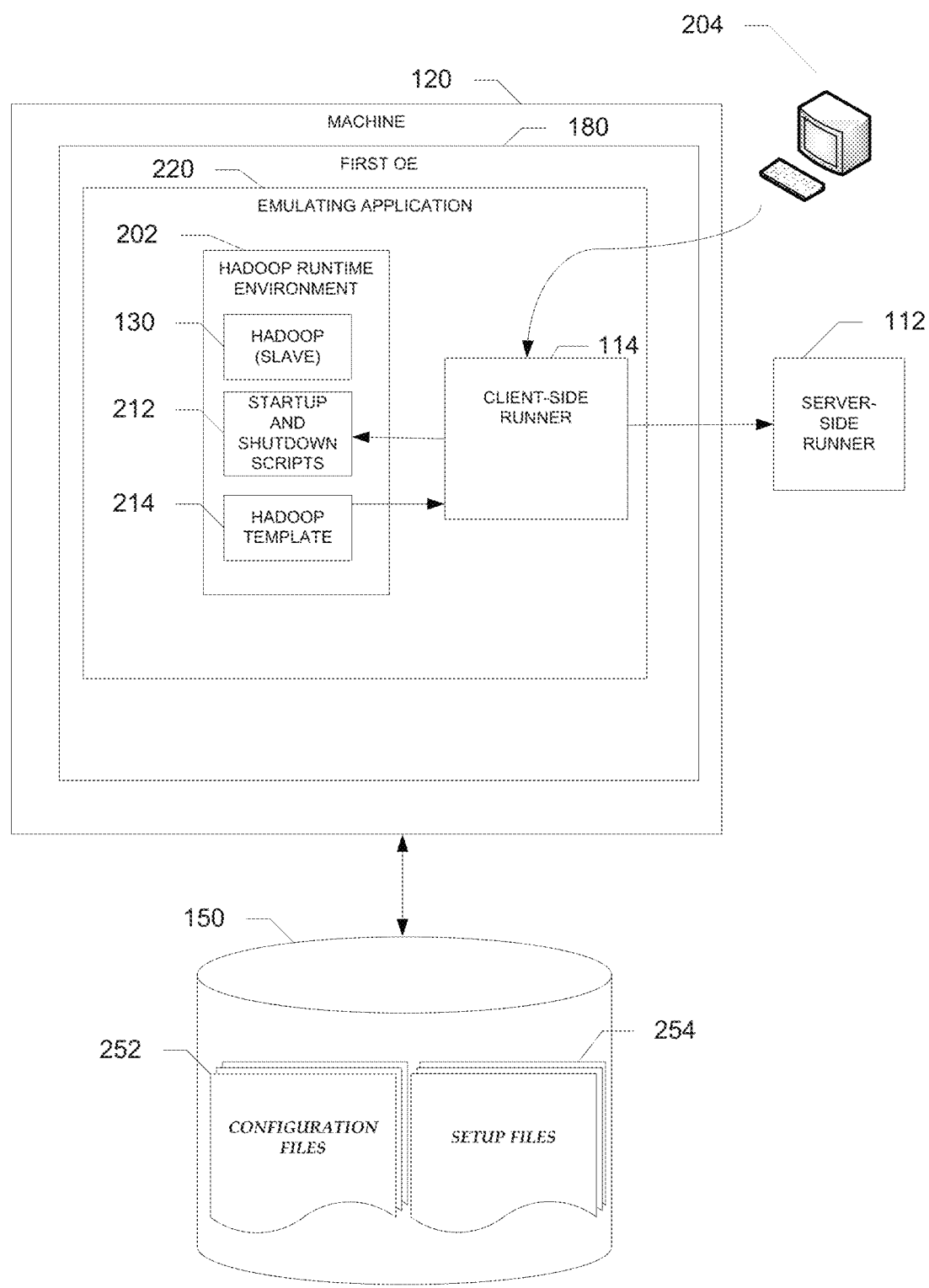
FIG. 2 is a block diagram showing a machine, according to example embodiment.

FIG. 2 is a block diagram illustrating a machine 120, according to an example embodiment. The machine 120 may run an unsupported OE, as previously described. FIG. 2 further shows that the first OE 180 (e.g., Windows) includes an emulating environment 220, which in turns includes a Hadoop runtime environment and the client-side runner module 114. In an example embodiment, the emulating application emulates a Linux-type environment to provide a Linux-like environment to support the Hadoop runtime environment 202. Cygwin is an example of the emulating application 220 that may execute within the Windows operating environment.

An end-user may interact with the Hadoop slave via a terminal 204 that is communicatively coupled to the client-side runner module 114. The end-user may configure the slave node 130 and, in response, the client-side runner module 114 will modify setup files 254 and configuration files 252 via startup and shutdown scripts 212. In an example embodiment, Hadoop may utilize passphraseless secure shell (SSH). The startup and shutdown scripts 212 may facilitate the generation of SSH keys. For example, the startup and shutdown scripts 212 may check if Digital Signature Algorithm (DSA) keys already exist. If they do not, the startup and shutdown scripts 212 may create and store keys in an .ssh directory. Next, the appropriate permissions may be set on the directory. The startup and shutdown scripts 212 may perform the same operations on the master node side to ensure all of the keys are created, as further described with reference to FIG. 5.

A Hadoop template 214, as will be further described with reference to FIG. 4, includes instrumented Hadoop code to control file access to the local storage 150 or to the network file system 152 via the client-side runner module 114 and server-side runner module 112.

Figure 3:
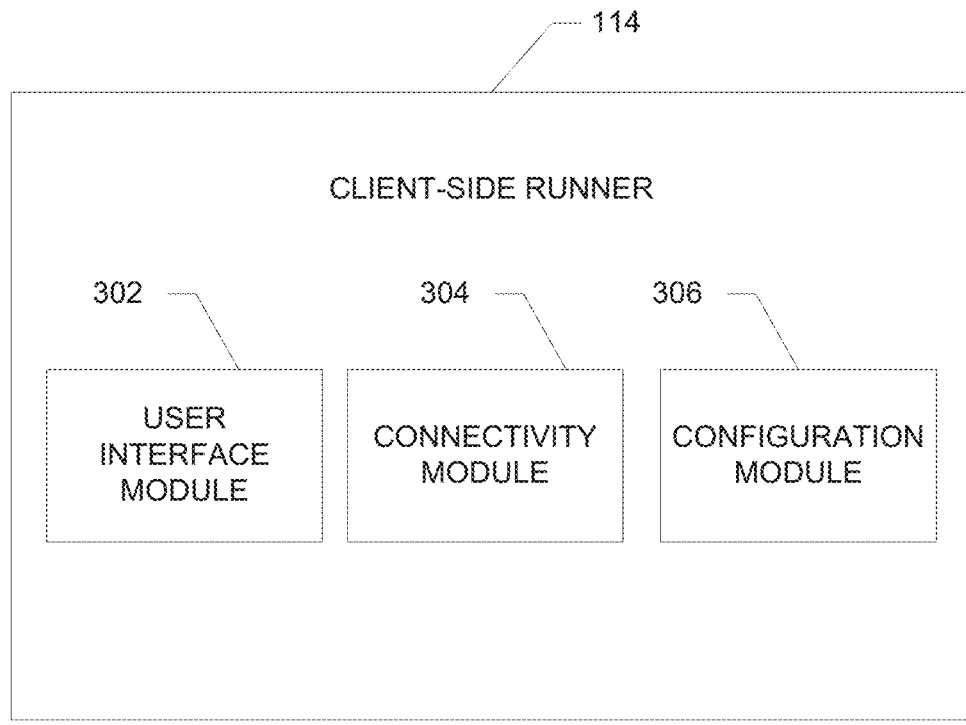
FIG. 3 is a block diagram showing a client-side runner module, according to an example embodiment.

FIG. 3 is a block diagram that shows the components of the client-side runner module 114, according to an example embodiment. The client-side runner module 114 includes a user interface module 302, a connectivity module 304, and a configuration module 306. The user interface module 302 receives commands from the terminal 204 of FIG. 2 to, among other things, add and/or remove a slave node from a Hadoop cluster, configure the storage space used by Hadoop, and/or display information about the status of the Hadoop node. To assist troubleshooting, the user interface module 302 may also provide status of the node (e.g., is the note connected or not), hostname, memory usage (e.g., space allocated and space available), and a number of running jobs (to inform the end-user that any jobs are in progress).

The connectivity module 304 provides a communication path between the client-side runner module 114 and the server-side runner module 112 of FIG. 2. In an example embodiment, the connectivity module 304 may communicate to the server-side runner module 112 of FIG. 2 via a socket connection. The socket connection may communicate messages to prompt the server-side runner module 112 to add the slave node to a list of nodes, to remove a slave node from the list of nodes, and to add security keys used to set up a slave note.

The configuration module 306 of the client-side runner 114 may access and modify various Hadoop related properties. Example embodiments may include a property reader any property writer factories that allow for easier reading and writing of the configuration files 252 and the setup files 254, both shown in FIG. 2. For example the property reader and property writer classes are used by the client-side runner to access the setup.ini in hadoop-site.xml properties. Setup.ini may be read from and written to during setup to save important information including the location of Hadoop, the master server address, and the location of Cygwin. Hadoop-site.xml may be read from, and written to upon, a configuration change within the settings of Hadoop, or when Hadoop needs information about the cluster configuration. The configuration module 306, therefore, allows an easy to use interface to the Hadoop setup and configuration files 252 and setup files 254.

Figure 4:
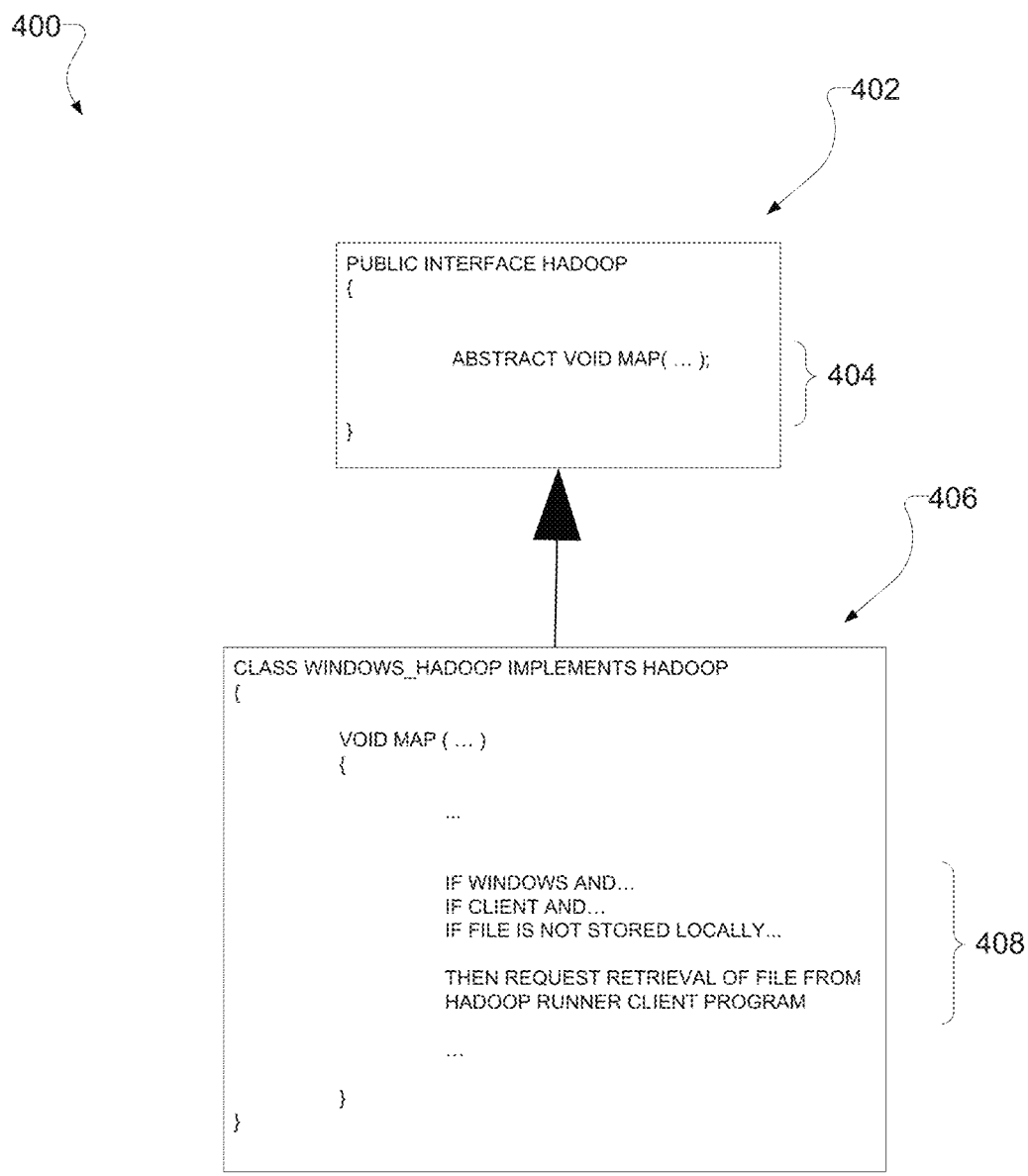
FIG. 4 is a class diagram illustrating a specialization class, according to an example embodiment.

FIG. 4 is a class diagram 400 illustrating a specialization class (Windows_Hadoop 406) implementing a Hadoop interface 402, according to an example embodiment. The Hadoop interface 402 is an interface class that may be declared by the Hadoop framework. The Hadoop interface 402 may include an abstract map method 404 that may be specialized. The Windows_Hadoop class 406 specializes the Hadoop interface 402 and is to be a component of the slave node 130 of FIG. 1 that runs within the Windows operating environment. As FIG. 4 shows, Windows_Hadoop class 406 provides functionality 408 that makes the following determinations before accessing a file: whether the slave node is operating within a Windows operating environment, whether the slave node is part of the client, and whether the file is stored locally. Based on these determinations the Windows_Hadoop class 406 may request retrieval of the file from the client-side runner module 114 of FIG. 3.

Although FIG. 4 illustrates a class-hierarchy, other implementations known in the art are possible. For example, rather than providing functionality via sub classing, Hadoop may provide a template class and the software developer may code in functionality within the specified template areas.

Figure 5:
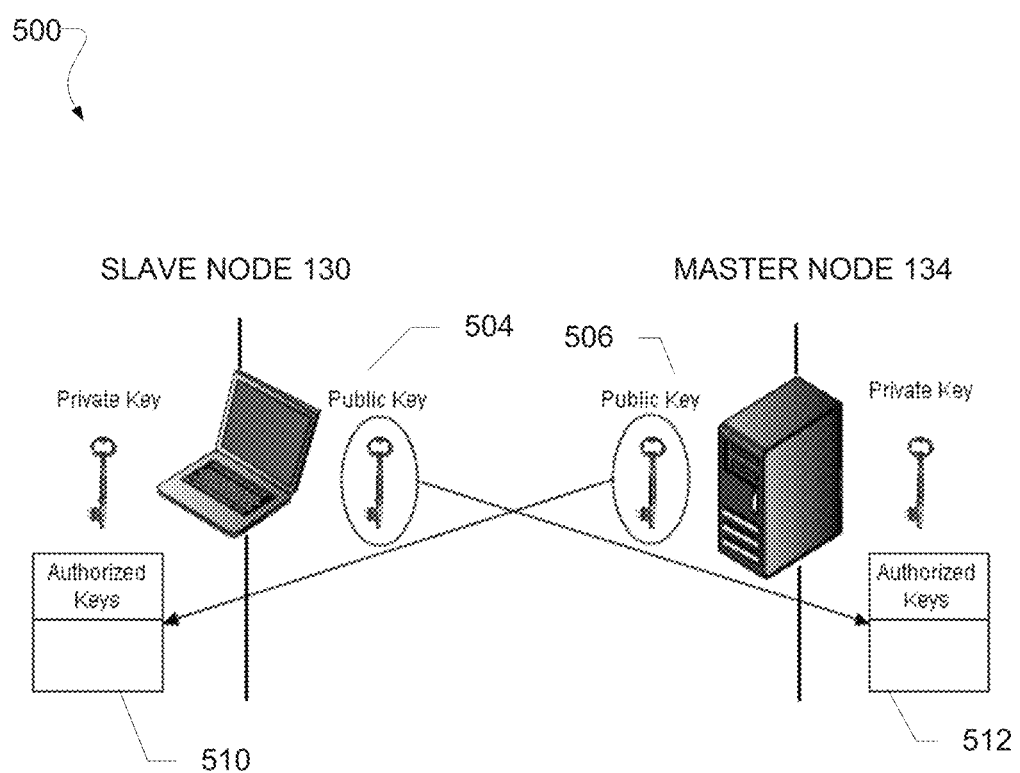
FIG. 5 is a block diagram illustrating operations to enable a passphraseless SSH, according to an example embodiment.

FIG. 5 is a block diagram 500 illustrating operations that may be used to enable passphraseless SSH for the slave node 130 and the master node 134 both shown in FIG. 1, according to an example embodiment. To successfully connect to the master node 134, the slave node 130 may send its public key 504 to the authorized keys file 512 of the master node 134. The authorized keys file 512 may be utilized to store a list of public keys that are allowed to access that master node 134 through SSH. In an example embodiment, the configuration module 306 of FIG. 3 may connect to the master node 134, using SSH, and concatenates the slave node's client-side public key 504 to the master node 134 authorized keys file 512. Likewise, the configuration module 306 may retrieve the public key 506 from the master node 134 and concatenates it to the slave node 130 authorized keys file 510. Exchanging the keys allows the slave node 130 to successfully SSH to the master node 134 without a password.

In an example embodiment, a dedicated Hadoop user account may not be available. Setting up passphraseless SSH for a slave node may not work if a separate user account may be the one starting the master node and executing the Hadoop commands. In this case, a socket connection between the slave node 130 and the master node 134 may send a command to the master node 134 containing the private key. The connection on the Hadoop administrator's side (e.g., server-side runner module 110 of FIG. 2) may write the key to a Hadoop_Home/.ssh directory. Additionally, the server-side runner module 110 may modify an sshconfig file with lines specifying the hostname, username, and key location for the connection that is being set up. The sshconfig file may be specified as an option when connecting via SSH, which forces the connection to connect using a specific username and key for each slave node. In doing so, the Hadoop admin may be enabled to successfully connect as a different user for each slave node without a password.

Figure 6:
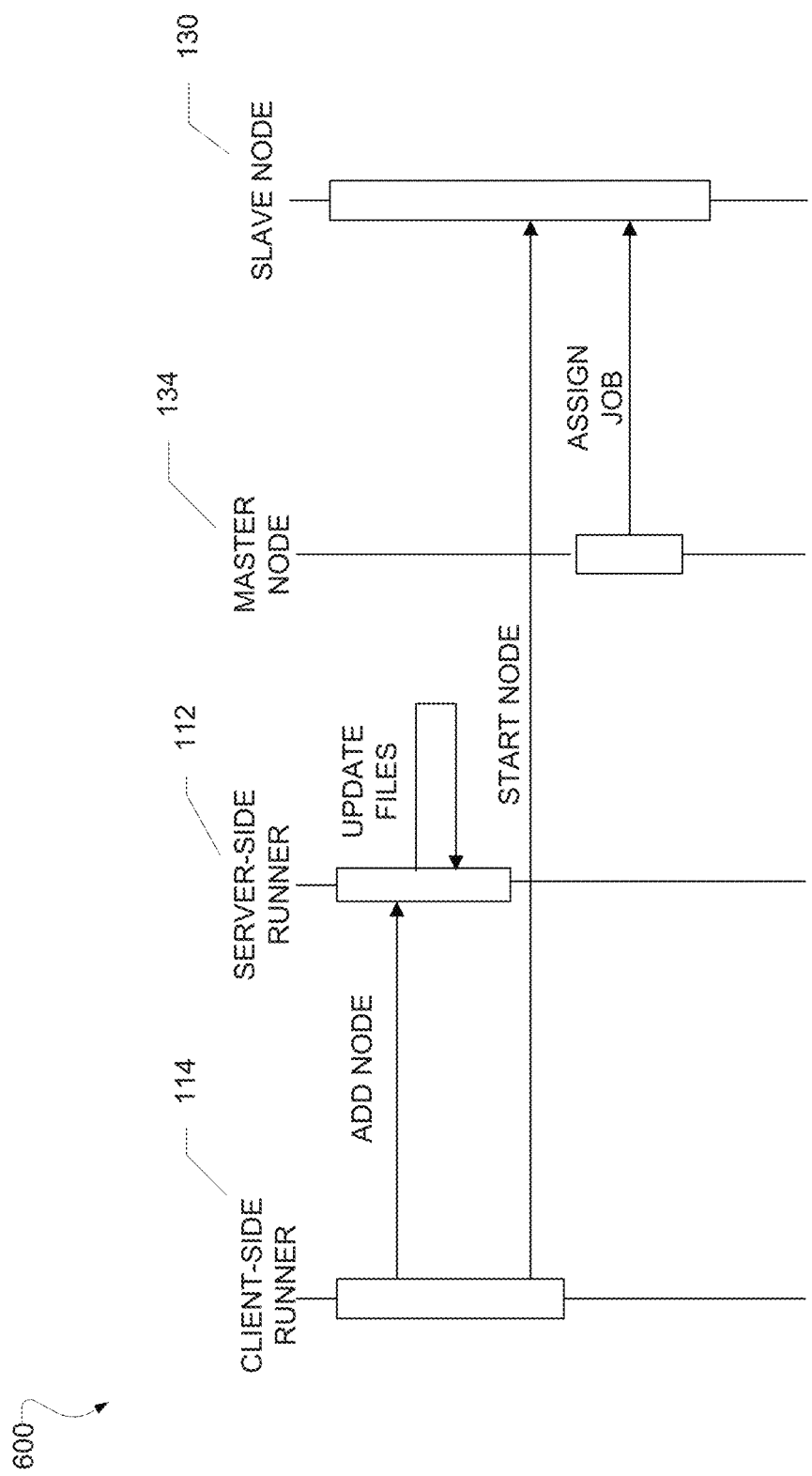
FIG. 6 is a message diagram illustrating a sequence of messages to add a slave node, according to an example embodiment.

FIG. 6 is a message diagram 600 that illustrates the sequence of messages exchanged to add the slave node 130 to the hybrid Hadoop cluster 102, of FIG. 1, according to an example embodiment. The client-side runner module 114 may send a message to the server-side runner module 112 to add the slave node 130 to the hybrid Hadoop cluster 102. Responsive to receiving the add node message, the server-side runner module 112 may update the files stored on the network file system 152 of FIG. 1. For example, the server-side runner module 112 may add the slave node's IP address or hostname to the slaves file 164, illustrated in FIG. 1. The slave node's IP address or host name may already be stored in the slaves file 164 if the slave node has previously existed on the hybrid cluster 102. Also, the server-side runner module 112 may identify the slave node 130 as not listed in the exclude file 162. The client-side runner module 114 may then starts the slave node 130. In an example embodiment, the slave node 130 may be started by receiving the following commands from the terminal 204: "/bin/hadoop-daemon.sh start datanode" and "bin/hadoop-daemon.sh start tasktracker" and executing the commands. Upon starting, the slave node 130 may receive jobs from the master node 134.

Figure 7:
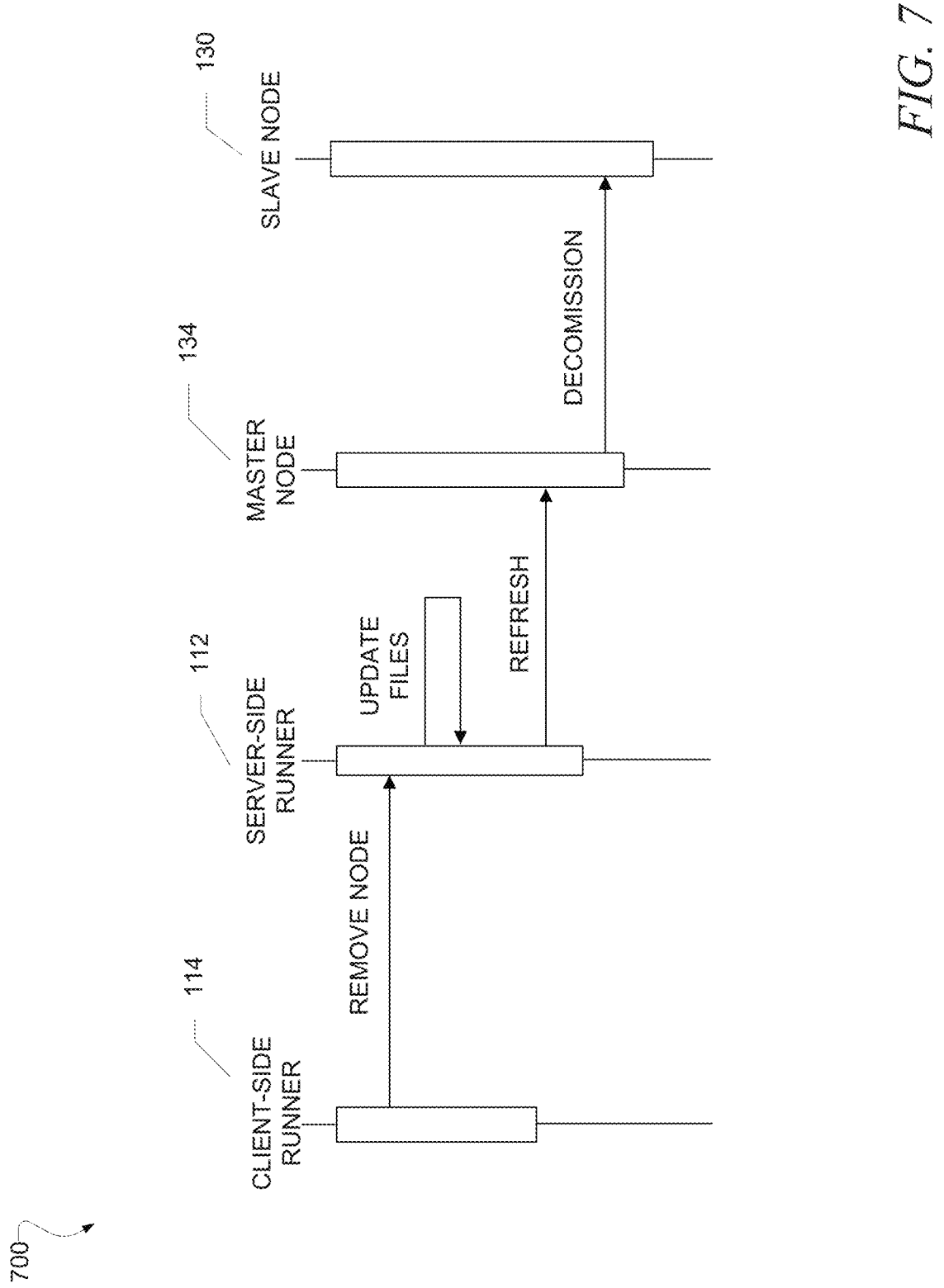
FIG. 7 is a message diagram illustrating a sequence of messages to remove a slave node, according to an example embodiment.

FIG. 7 is a message diagram 700 that illustrates the sequence of messages that may be exchanged in order to remove the slave node 130 from the hybrid cluster 102 of FIG. 1. Removing the slave node 130 works similar to adding the slave node 130. For example, removing the slave node 130 may include the client-side runner module 114 sending a message to the server-side runner module 112 to remove the slave node 130. In an example embodiment, the server-side runner module 112 may add the slave node 130 to the exclude file 162 of FIG. 1. Further, the server-side runner module 112 may notify the master node 134 to refresh the list of active nodes. Responsive to receiving the command to refresh the list of active nodes, the master node 134 may repopulate the list of valid nodes from the slaves and exclude files 162 and 164. Since the exclude file 162 now lists the slave node 130, the master node 134 may perform a decommissioning of the slave node 130.

Figure 8:
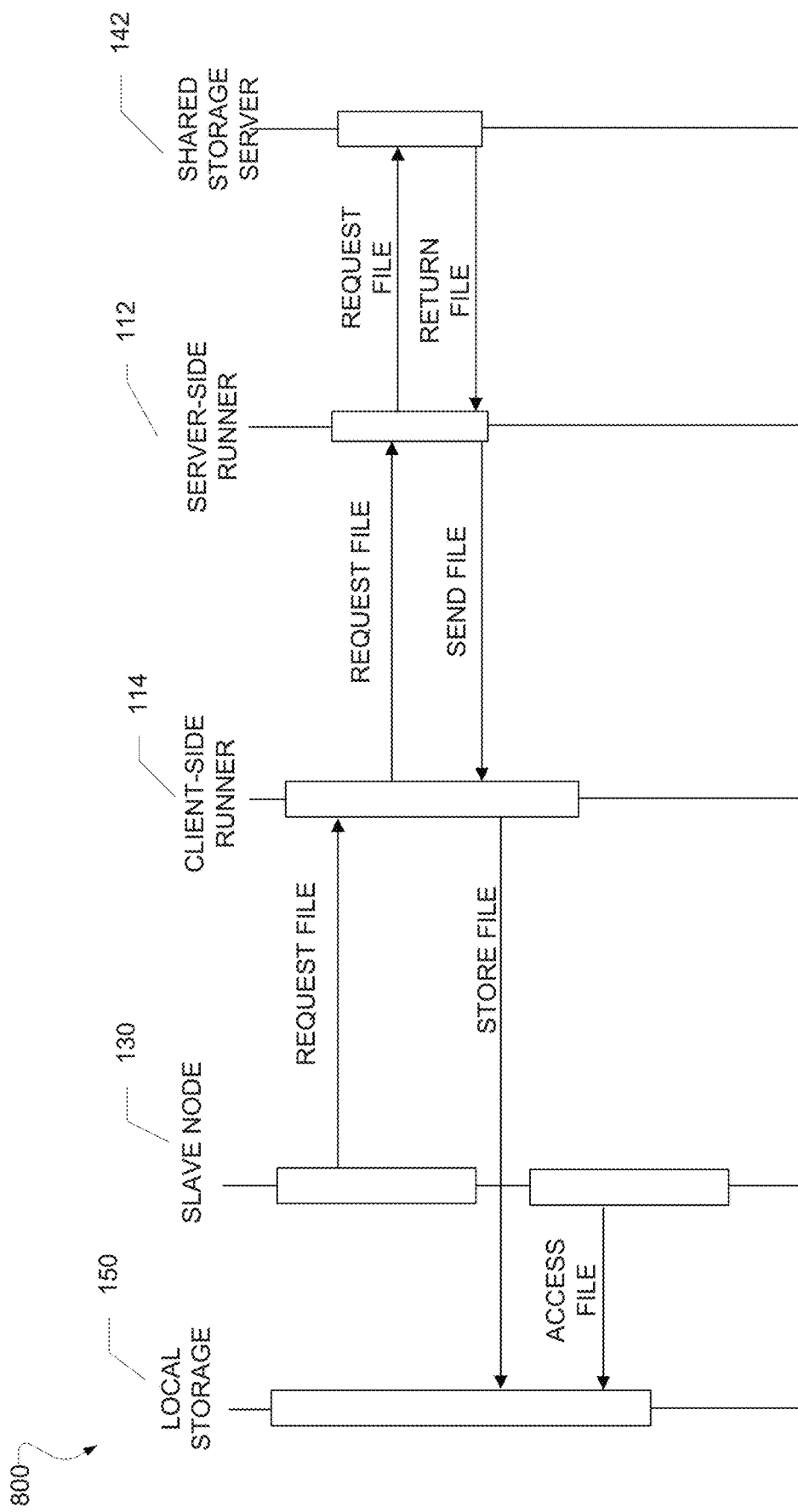
FIG. 8 is a message diagram showing a sequence of messages sent to facilitate a file access, in an example embodiment.

FIG. 8 is a message diagram 800 showing the messages sent to facilitate the file access for the slave node 130, in an example embodiment. By way of example, the slave node 130 may request the client-side runner module 114 for the log file 166 of FIG. 1. In an example embodiment, the Windows_Hadoop class 406 of FIG. 4 may initiate this file request message based on determining that the slave node 130 is located on a machine operating the Windows operating environment and that the log file 166 is not stored locally on the local storage 150 (including a local file system). Responsive to receiving the file request, the client-side runner module 114 may send the file request to the server-side runner module 112 via the connectivity module 304 of FIG. 3. The server-side runner module 112 may then request the log file 166 from the shared storage server 142. The log file 166 may then be stored in the local storage 150 by way of the client-side runner module 114 and server-side runner module 112. Once the log file 166 is stored in the local storage 150, the slave node 130 may directly access the log file 166 through the local storage 150.

FIGS. 6-8 are message diagrams illustrating methods and systems according to some example embodiments. While operations of these methods are described above as being performed by specific components, modules or systems of the content provider 100 of FIG. 1, it will be appreciated that these operations need not necessarily be performed by the specific components identified, and could be performed by a variety of components and modules, potentially distributed over a number of machines. Alternatively, at least certain ones of the variety of components and modules described herein can be arranged within a single hardware, software, or firmware component.

The hybrid Hadoop cluster allows the content provider to avoid a major bottleneck in the log processing system using a network file system. To illustrate, previous systems stored log files on a network file system rather than on local machines. When many Hadoop nodes try to read the log data at once, they were limited by the output bandwidth of the network file system. As a result, even if the content provider were to add additional machines to speed up log processing, the data may not be processed faster because the bandwidth from the network storage would be split among even more computers. In comparison, the hybrid Hadoop cluster takes advantage of developer workstations when they are not in use. This provides many more potential nodes and, in turn, speeds up the processing of jobs. Additionally, hybrid Hadoop clusters removed the bottleneck by storing the log data locally on the participating nodes.

Example Machine Architecture and Machine-Readable Medium

Figure 9:
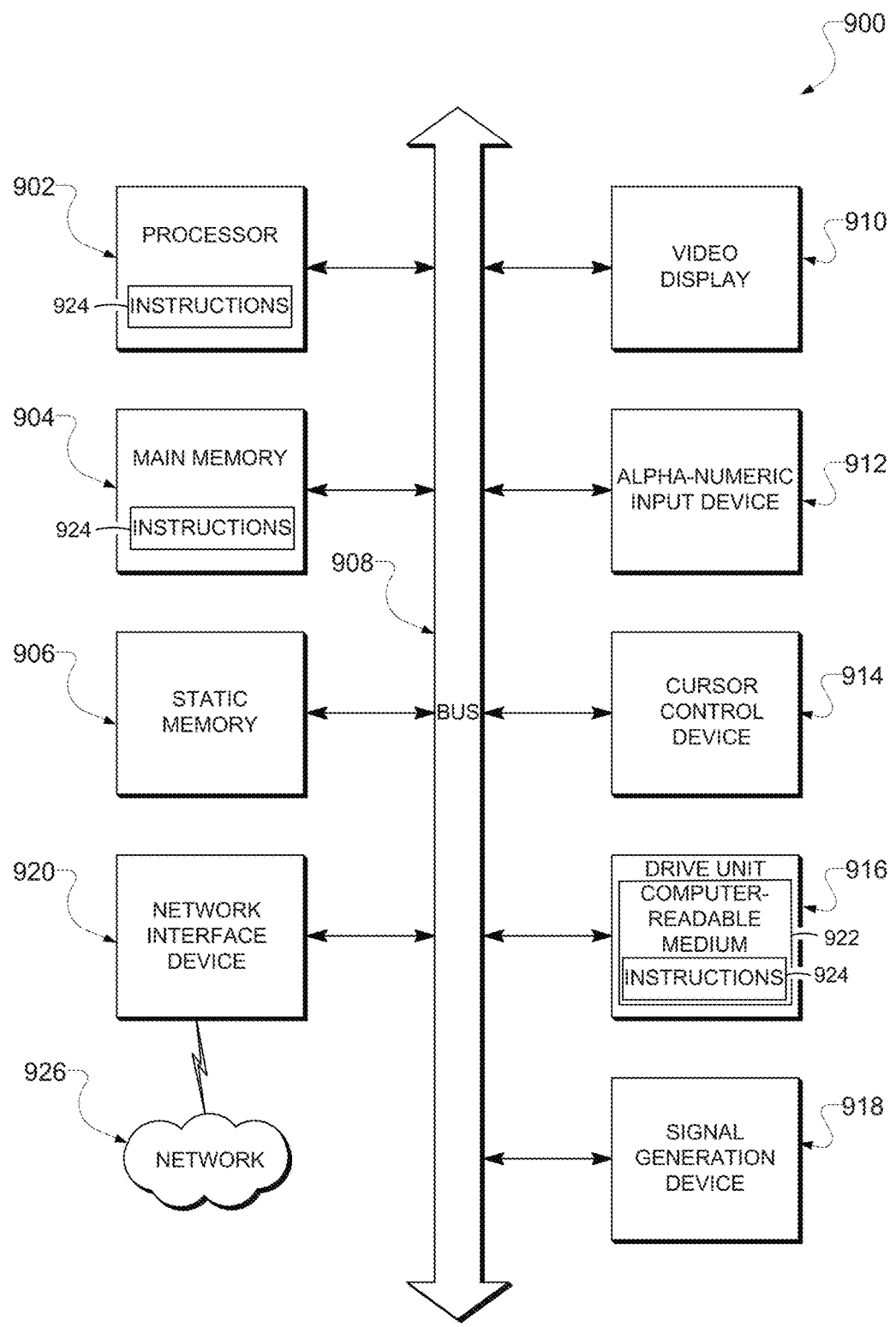
FIG. 9 is a diagrammatic representation of a machine in the example form of a computer system within which set of instructions for causing the machine to perform any one or more of the methodologies discussed herein may be executed.

FIG. 9 is a block diagram of a machine in the example form of a computer system 900 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or client devices in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a disk drive unit 916, a signal generation device 918 (e.g., a speaker) and a network interface device 920.

Machine-Readable Medium

The disk drive unit 916 includes a computer-readable medium 922 on which is stored one or more sets of instructions 924 and data structures (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., Hypertext Transfer Protocol (HTTP)). Examples of communication networks include a local area network (LAN), a wide area network (WAN), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible medium to facilitate communication of such software.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Although certain specific example embodiments are described herein, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments are described and illustrated in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
one or more processors;
one or more non-transitory computer-readable media containing instructions that, in response to being executed by the one or more processors, cause the system to perform one or more operations comprising:
receive, from a master node in a cluster of nodes, a command for a first slave node to process a file, the first slave node operating within a first operating system, the cluster of nodes configured to utilize a second operating system different from the first operating system, the cluster of nodes including the first slave node that operates within the first operating system and a plurality of second slave nodes that utilize the second operating system;
in response to the command, initiate a specialized class within the first operating system to facilitate access to the cluster, the specialized class configured to, prior to attempting to access the file for processing as instructed by the master node, determine:
whether the first slave node is operating within the first operating system different from the second operating system of the cluster; and
whether the file is accessible via a local file system of the first operating system;
based on determining both (i) the first slave node is operating within the first operating system, and (ii) the file is inaccessible via the local file system of the first operating system, send a request, by the specialized class, to a client-side runner module for the file, the client-side runner module configured to request the file from a shared storage server via a server-side runner module, the server-side runner module configured to communicate with the shared storage server on behalf of the first slave node using the second operating system;

in response to receiving the file from the server-side runner module, store the file locally in the local file system of the first operating system within which the first slave node is operating; and process the file as commanded by the master node by first accessing the file directly from the local file system.

2. The system of claim 1, wherein the second operating system natively supports Hadoop.

3. The system of claim 2, wherein
the cluster of nodes includes the master node that utilizes the second operating system and is configured to distribute data among the first slave node and the plurality of second slave nodes; and
the operations further comprise:
receive a server key from the master node, and
store the server key at the first slave node such that the first slave node accesses the cluster of nodes without a passphrase being manually entered.

4. The system of claim 1, wherein the operations further comprise:
send a message to add the first slave node to the cluster of nodes, the message being sent to the server-side runner module, and
update the shared storage server to indicate the first slave node as being added to the cluster of nodes.

5. The system of claim 1, wherein the operations further comprise:
send a message to remove the first slave node from the cluster of nodes, the message being sent to the server-side runner module, and
update the shared storage server to indicate the first slave node as being removed from the cluster of nodes.

6. The system of claim 1, wherein:
the first operating system executes an emulating program that emulates an environment of the second operating system; and
the first slave node is configured to make an operating system call that is natively supported by the second operating system based on the emulating program executed by the first operating system.

7. The system of claim 1, wherein the cluster of nodes processes log files of a content provider stored in the cluster of nodes, and the file is at least part of the log files.

8. A method comprising:
receiving, from a master node in a cluster of nodes, a command for a first slave node to process a file, the first slave node operating within a first operating system, the cluster of nodes configured to utilize a second operating system different from the first operating system, the cluster of nodes including the first slave node;
in response to the command, initiating a specialized class within the first operating system to facilitate access to the cluster, the specialized class configured to, prior to attempting to access the file for processing as instructed by the master node, determine:
whether the first slave node is operating within the first operating system that is different from the second operating system of the cluster; and
whether the file is accessible via a local file system of the first operating system;

based on determining both (i) the first slave node is operating within the first operating system, and (ii) the file is inaccessible via the local file system of the first operating system, sending a request, by the specialized class, to a client-side runner module for the file, the client-side runner module configured to request the file from a shared storage server via a server-side runner module, the server-side runner module configured to communicate with the shared storage server using the second operating system and on behalf of the first slave node; and in response to receiving the file from the server-side runner module, storing the file locally in the local file system of the first operating system within which the first slave node is operating such that the first slave node can directly access the file using the first operating system.

9. The method of claim 8, wherein the second operating system natively supports Hadoop.

10. The method of claim 9, wherein:
the cluster of nodes includes the master node that utilizes the second operating system and is configured to distribute data among the first slave node and a plurality of second slave nodes, the plurality of second slave nodes utilizing the second operating system; and
the method further comprises:
receiving a server key from the master node, and
storing the server key at the first slave node such that the first slave node accesses the cluster of nodes without a passphrase being manually entered.

11. The method of claim 8, further comprising:
sending a message to add the first slave node to the cluster of nodes, the message being sent to the server-side runner module, and
updating the shared storage server to indicate the first slave node as being added to the cluster of nodes.

12. The method of claim 8, the method further comprising:
sending a message to remove the first slave node from the cluster of nodes, the message being sent to the server-side runner module, and
updating the shared storage server to indicate the first slave node as being removed from the cluster of nodes.

13. The method of claim 8, wherein the cluster of nodes processes log files of a content provider stored in the cluster of nodes, and the file is at least part of the log files.

14. A non-transitory computer-readable medium containing instructions that, in response to being executed by one or more processors, cause a machine to perform operations, the operations comprising:
receiving, from a master node in a cluster of nodes, a command for a first slave node to process a file, the first slave node operating within a first operating system, the cluster of nodes configured to utilize a second operating system different from the first operating system, the cluster of nodes including the first slave node and a plurality of second slave nodes that utilize the second operating system;
in response to the command, initiating a specialized class within the first operating system to facilitate access to the cluster, the specialized class configured to, prior to attempting to access the file for processing as instructed by the master node, determine:
whether the first slave node is operating within the first operating system that is different from the second operating system of the cluster; and whether the file is accessible via a local file system of the first operating system;

based on determining both (i) the first slave node is operating within the first operating system, and (ii) the file is inaccessible via the local file system of the first operating system, sending a request, by the specialized class, to a client-side runner module for the file, the client-side runner module configured to request the file from a shared storage server via a server-side runner module, the server-side runner module configured to communicate with the shared storage server using the second operating system; and in response to receiving the file from the server-side runner module, store the file locally in the first slave node.

15. The computer-readable medium of claim 14, wherein the second operating system natively supports Hadoop.

16. The computer-readable medium of claim 15, wherein:
the cluster of nodes includes the master node that utilizes the second operating system, and is configured to distribute data among the first slave node and the plurality of second slave nodes; and
the operations further comprise:
receive a server key from the master node, and
store the server key at the first slave node such that the first slave node accesses the cluster of nodes without a passphrase being manually entered.

17. The computer-readable medium of claim 14, wherein the operations further comprise:
send a message to add the first slave node to the cluster of nodes, the message being sent to the server-side runner module, and
update the shared storage server to indicate the first slave node as being added to the cluster of nodes.

18. The computer-readable medium of claim 14, wherein the operations further comprise:
send a message to remove the first slave node from the cluster of nodes, the message being sent to the server-side runner module, and
update the shared storage server to indicate the first slave node as being removed from the cluster of nodes.

19. The computer-readable medium of claim 14, wherein:
the first operating system executes an emulating program that emulates an environment of the second operating system; and
the first slave node is configured to make an operating system call that is natively supported by the second operating system based on the emulating program executed by the first operating system.

20. The computer-readable medium of claim 14, wherein the cluster of nodes processes log files of a content provider stored in the cluster of nodes, and the file is at least part of the log files.

* * * * *